United States Patent [19]

Harmand et al.

[11] Patent Number: 5,725,335
[45] Date of Patent: Mar. 10, 1998

[54] APPARATUS FOR MACHINING VALVE SEATS IN AN ENGINE CYLINDER HEAD

[75] Inventors: Brice Harmand, San Diego, Calif.; Pierre Harmand, Annecy, France

[73] Assignee: Harmand Family Limited Partnership, San Diego, Calif.

[21] Appl. No.: 786,760

[22] Filed: Jan. 24, 1997

Related U.S. Application Data

[63] Continuation of Ser. No. 490,468, Jun. 14, 1995, Pat. No. 5,613,809.
[51] Int. Cl.$^6$ .............. B23B 41/12; B23B 47/26; B24B 15/02
[52] U.S. Cl. .............. 408/83.5; 408/234; 451/430
[58] Field of Search .............. 408/1 R, 78–82, 408/83.5, 234–237, 709; 451/430

[56] References Cited

U.S. PATENT DOCUMENTS

| 3,728,940 | 4/1973 | Peterson | 90/12.5 |
|---|---|---|---|
| 4,147,462 | 4/1979 | Appleby et al. | 408/80 |
| 4,365,917 | 12/1982 | Harmand | 409/201 |
| 4,545,706 | 10/1985 | Hiroyasu et al. | 408/1 |
| 4,630,977 | 12/1986 | Theofanous | 408/83.5 |
| 4,792,265 | 12/1988 | Rottler et al. | 408/237 |
| 4,852,306 | 8/1989 | Harmand | 51/241 |
| 4,913,601 | 4/1990 | Tenand et al. | 408/143 |
| 5,001,871 | 3/1991 | Harmand | 51/241 |
| 5,017,062 | 5/1991 | Leroux et al. | 409/179 |
| 5,095,787 | 3/1992 | Leroux et al. | 82/118 |
| 5,613,809 | 3/1997 | Harmand et al. | 408/234 |

FOREIGN PATENT DOCUMENTS

| 0300959 | 6/1988 | European Pat. Off. | |
|---|---|---|---|
| 2420273 | 6/1975 | Germany | 408/236 |
| 9204152 | 3/1992 | WIPO | |

*Primary Examiner*—Steven C. Bishop
*Attorney, Agent, or Firm*—Brown, Martin, Haller & McClain

[57] ABSTRACT

The valve seat and guide machine comprises a base structure on which is pivotally supported a pantograph having a major arm on which is mounted a drive motor and minor arm which moves slidably with respect to the major arm. Pivotally attached to each arm of the pantograph is a head portion with a support frame which retains a spherical head and a plurality of sphere seats for supporting the spherical head so that it can pivot around its centerpoint at the center of the sphere. A stepper motor is disposed at the top of the spherical head and a spindle disposed with the spherical head retains a cutting bit and a pilot which extend from the bottom of the spherical head. Small z-axis displacement and spindle feed/retraction along the z-(vertical) axis is provided by the stepper motor. The drive motor rotates a transmission linkage which, in turn, rotates the spindle using cone-shaped pinions to cause the cutting bit, typically carbide, to cut the valve seat. Small x,y displacements are enabled by moving the entire spherical housing and its supporting sphere seats with respect to the support frame. The pantograph swings up and down on the base to provide large z-axis displacement to remove the spindle from the cutting position and to provide clearance for movement to another machine site. A system controller receives feedback from system monitors to control a spindle rotations and feed/retraction.

20 Claims, 6 Drawing Sheets

APPARATUS FOR MACHINING VALVE SEATS IN AN ENGINE CYLINDER HEAD

This is a continuation of application Ser. No. 08/490,468, filed Jun. 14, 1995, now U.S.Pat. No. 5,613,809.

BACKGROUND OF THE INVENTION

In internal combustion engines, it is essential that the cylinders be completely airtight when the valves are closed to assure efficient fuel consumption and transfer of power. This airtightness is achieved, among other things, by assuring that the valve heads perfectly match the valve seats. Since contact surfaces of the valves and valve seats are subject to wear and other degrading factors that affect the contact surface textures, these surfaces must be modified to re-establish the high quality seal.

It is well known among vehicle mechanics, especially that valve seats can be machined to remove the outer surface of the seat to expose a smooth and uniform contact surface. This machining is accomplished by removing the engine cylinder head and inverting it on a work surface to provide access to the valve seats. A cutting blade is positioned to cut at the desired radius and a pilot which is concentric with the center of rotation of the cutting blade is inserted into the valve guide to center the cutting edge. A spindle attached to a drive motor rotates the blade and pilot to remove the outer layer of the contact surface of the valve seat.

While this procedure would be easy to set up and would provide consistent results if all valve guides were oriented in the same direction, cylinder heads have a wide range of valve guide orientation (angular displacement) within a single head, with two or four valves per cylinder. Thus, it is necessary to provide capability to move both the tool position along the length and width of the cylinder head and the valve guide orientation. In order to achieve this, it is necessary to provide precision movement of a large, heavy piece of equipment.

Probably the best known system providing adjustability of the machining head is that it is manufactured and sold by Serdi, a portion of which is disclosed and claimed in U.S. Pat. No. 4,365,917, issued Dec. 28, 1982, of Pierre Harmand, one of the co-inventors of the present invention. This work-holding device utilizes a machine head with a spherical guide within a spherical guide seat conforming to the sphere. The machine head is mounted on a base and a horizontal plane is provided by moving the system's base along an air cushion. The air cushion provides virtually frictionless motion. Air cushions are also created between the sphere and the sphere seat to allow the machine components (motor, spindle, etc.) to be displaced about the sphere's centroid, changing the angular orientation of the spindle. A closely-toleranced pilot (within 1/100mm of the valve guide inner diameter) is introduced into a valve guide and machine head self-centers with the sphere moving freely within the guide seat. A locking system locks the sphere in place once it is properly aligned. After machining the valve seat, the sphere is unlocked and the pilot is extracted. The spindle is returned to a vertical starting position and the process is repeated for each valve seat of the cylinder head.

A disadvantage of the above system is that the entire machine head is lifted and supported by the air cushion to center the spindle. Since the head moves freely at this point, the significant weight of the head, approximately 440 lbs. (200 kg), develops considerable kinetic energy which must be controlled to insert the pilot into the valve guide, and the pilot must be able to absorb the kinetic energy of the head to hold its movement until all oscillation has ceased and any flexion of the pilot has stopped. In short, the pilot acts as a spring and realigns/centers the machine head until all lateral forces dissipate.

A second prior art embodiment of a valve seat and guide machine provides horizontal travel by way of a movable stage onto which the cylinder head is clamped. The spindle still moves within a spherical housing to provide angular control, however, lateral adjustment is enabled by the stage which is separated by the base of the fixed head system by an air cushion. While this system may have an advantage in that the weight of the machine head does not need to be moved, the combined weight of the moveable stage and the cylinder head is over 330 lbs (150 kg) which means the considerable momentum is generated when the stage is moved. Further, this system has the disadvantage that the head height is fixed relative to the work surface, such that z-axis adjustability can only be attained by modifying the spindle length. Using slides, this can result in frequent spindle modifications and may impact centering and rotational stability due to variable lengths and rigidity of the spindle and the fact that spindles are typically driven from the end farthest from the cutting tip.

Prior art valve seat machining systems have displayed further problems when repeatably cutting valve seats with a three-angle cutter. In this procedure, a large surface is typically being cut, making control especially crucial. Particularly, the machinist must keep the cutter from rubbing the metal once the cut is completed, i.e., when the spindle feed is completed. It is established that the best cut is obtained when the spindle rotates one to three turns without cutting at the end of the cut, in a "polishing" type of process. If the operator fails to bring the spindle back up, since the cutter is still in contact with the valve seat, it will vibrate or chatter, possibly damaging the valve seat and/or the cutting bit. In order to achieve the ideal one to three additional turns to assure that the valve seat is round but still avoid vibration or chatter, the user must be quick at raising the spindle, since at speeds of several hundred revolutions per minute, the desired few additional turns occur within fractions of a second. This makes control and repeatability a significant problem.

In view of the aforementioned inadequacies of the prior art, the need exists for a valve seat and guide machine that can readily compensate for the height difference within and between cylinder heads and which can be easily controlled in its lateral movement to provide rapid and accurate repositioning without undue strain on the pilot or spindle.

SUMMARY OF THE INVENTION

It is an advantage of the present invention to provide independent means for coarse and fine adjustment of lateral movement in a valve seat and guide machine for machining engine cylinder heads.

It is another advantage of the present invention to provide a machine for machining valve seats in an engine cylinder head that has a relatively lightweight head which can easily be controlled during lateral, vertical and angular movement without overcoming substantial momentum due to the weight of the machine head.

Yet another advantage of the present invention is to provide a precision machine for providing measurement of valve seat depth to be cut to assure uniformity in valve seat depth across a cylinder head.

In an exemplary embodiment the inventive valve seat and guide machine comprises a base structure on which is pivotally supported a pantograph having a major arm on which is mounted a drive motor and minor arm which moves slidably with respect to the major arm. Pivotally attached to each arm of the pantograph is a head portion with a support frame which retains a spherical head and a plurality of sphere seats for supporting the spherical head so that it can pivot around its centerpoint at the center of the sphere. A stepper motor is disposed at the top of the spherical head and a spindle and pilot extend from the bottom of the spherical head. The stepper motor is attached to a screw drive which in turn is attached to the spindle structure to provide spindle movement along the z-axis (up and down). Small z-axis displacement and spindle feed/retraction along the z-(vertical) axis is provided by the stepper motor. Spindle height is determined by a linear gauge which measures distance to the surface of the cylinder head into which the valve seat is to be cut in order to determine how deep the valve seat should be cut. The electrical signal from the linear gauge is provided to a computer control for the stepper motor which raises or lowers the height of the spindle to achieve a predetermined valve seat depth. The drive motor rotates a transmission linkage which in turn rotates the spindle using cone-shaped pinions to cause a cutting bit, typically carbide, mounted on the spindle to cut the valve seat. The transmission linkage enters through the side of the spherical housing to directly engage the spindle within the housing, allowing the use of a relatively short, lightweight spindle assembly.

Telescoping drive axle joints and universal joints in the transmission linkage connect the drive motor to the pinions so that when the spindle is moved along any axis and/or the sphere is rotated, connection is maintained for applying the drive force.

The base on which the pantograph is mounted includes means for lateral movement in the x,y plane, preferably by way of an air cushion or other friction, to provide large x,y displacement to move from one machine site on the cylinder head to another. Alternatively, the base can be fixed an large x,y displacement can be provided by using an x,y stage for supporting the cylinder head. Both alternatives are within the prior art.

Small x,y displacements are enabled by moving the entire spherical housing and its supporting sphere seats with respect to the support frame. This movement is facilitated by air cushions between the seats and support frame. Once adjustment is completed, the air cushions are disabled, and the spherical housing is locked in place. After machining a valve seat, centering pistons are activated to return the spindle to a zero position.

The pantograph swings up and down on the base to provide large z-axis displacement to remove the spindle from the cutting position, to provide clearance for movement to another machine site, and to compensate for height variations between and within cylinder heads. After attaining the desired large z-axis adjustment, locking pistons are extended to hold the pantograph in position.

A system controller includes a microprocessor which receives feedback from system monitors and gauges and provides signals controlling rotational speed and feed and retraction speed. Memory within the controller includes software for selecting appropriate machining parameters for precise, repeatable machining.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to parts, and in which.

DESCRIPTION OF THE PREFERRED EMBODIMENT

Figure 1:
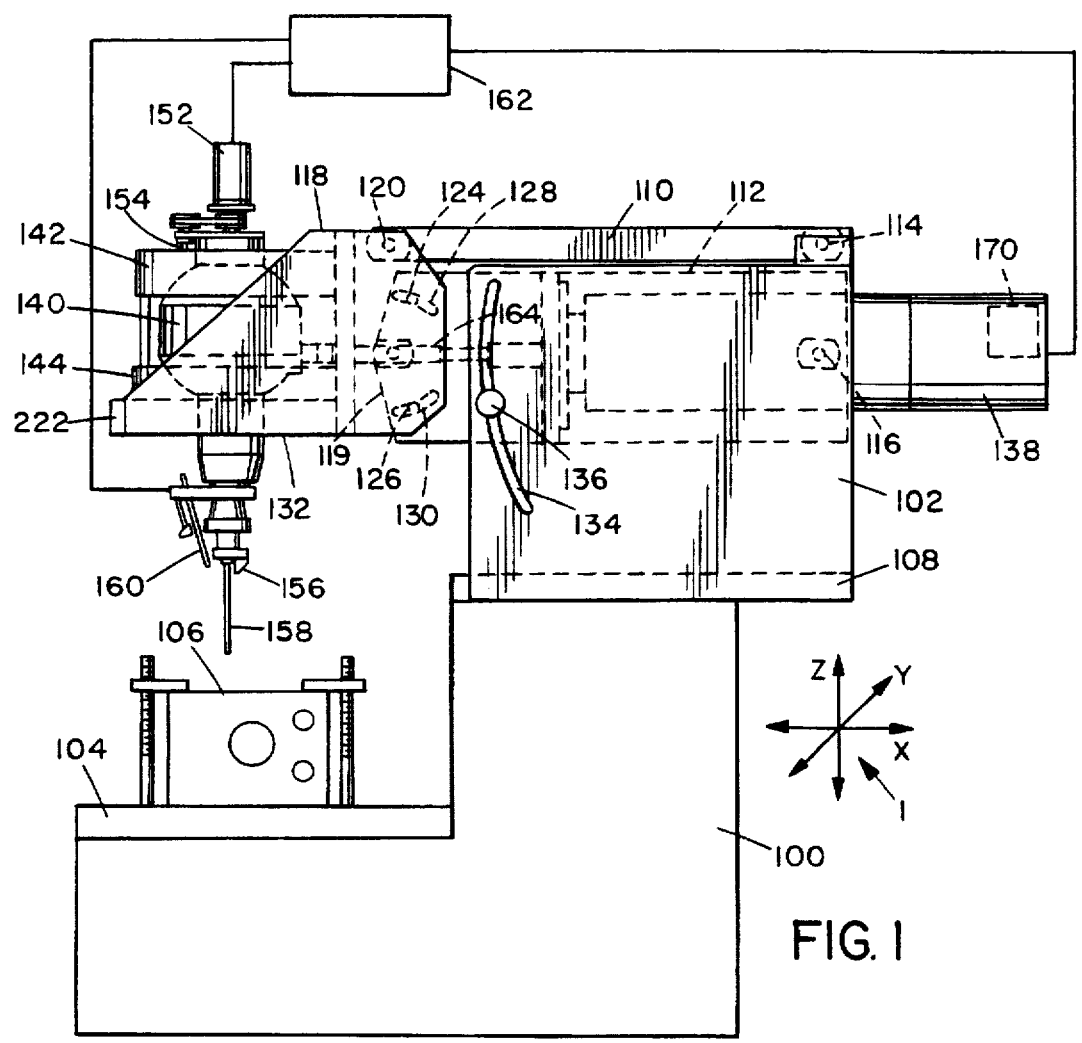
FIG. 1 is a side elevation view of the machine in use.

As illustrated in FIG. 1, the apparatus for machining valve seats has a base 102 mounted on a stand 100 or support means which also supports stage 104 on which an engine cylinder head 106 to be machined is clamped. (Screw-type clamps are illustrated, however, other clamps as are known in the art may be used.) Base 102 is mounted on stand 104 by way of an air cushion platform 108 which provides movement along the x, y plane. The x, y plane 2 and axes 1 are provided to facilitate descriptions of the relative movement of components of the inventive apparatus. Alteratively, an air cushion platform is disposed between stage 104 and stand 100 to allow x, y translation by moving the stage 104.

A pantograph consisting of arms 110 and 112 is pivotally attached to base 102 at pivot points 114 and 116 at the distal end of each arm. The proximal end 120 of arm 110 is pivotally attached to the top of head portion 118. The proximal end of arm 112 is attached via pivot 119 and the combination of lugs 124 and 126 and arcuate channels permits the ends of arm 112 of the pantograph to be moved up or down along the z-axis, pivoting on pivot points 116 while head portion 118 remains in a horizontal orientation, i.e., with the lower edge 132 of head portion 118 remaining parallel to stage 104. The combination of arcuate channel 134 and lug 136 guides the movement of arm 112.

Drive motor 138 is disposed within pantograph arm 112 and in addition to providing the drive means for machining, provides counterbalance to the weight supported by frame 118 to facilitate movement of the pantograph to make large adjustments along the z-axis. A tachometer 170 or other speed measurement device is included in the motor to provide an electrical signal which can be provided to system controller 162 as feedback to adjust operating parameters of the system.

Spherical housing 140 and sphere seats 142 and 144 are retained within head portion 118. Sphere seat 144 is mounted on air cushions supported by support frame 222 (shown in FIG. 2) to permit a small range of movement in the x, y plane. Sphere seat 142 is attached to and moves with seat 144. Spherical housing 140 is pivotable in all directions about its centroid to permit machining operations on valve seats with angular displacement from the z-axis. Spindle 150 is rotatably and slidably retained within spherical housing 140. Vertical movement of spindle 150 (along the z-axis) is provided by stepper motor 152 mounted on top of spherical housing 140. Stepper motor 152 drives a screw 154 to raise and lower spindle 150 with respect to spherical housing 140 to provide small z-axis adjustment and to provide feed and retraction of the spindle.

Spindle 150 rotates to turn cutting bit 156 and is guided by pilot 158 which fits closely within the valve guide of the engine cylinder head 106. Linear gauge 160 contacts the surface of the cylinder head and produces an electrical signal indicative of surface distance. This signal is provided to a system controller 162, which may be a dedicated microprocessor or a main system computer, which, in turn provides a command to stepper motor 152 to correctly adjust heights of the cutting bit, i.e., spindle height, to provide repeatable results in machining valve seat depth. Other means for measuring distance may be used, as are known in the art, including optical measurement techniques, e.g., lasers.

The system controller 162 includes memory for retaining programming with operational parameters determined empirically to be optimum for given type of engine, e.g., cylinder head metal, area to be machined, etc. These factors are used to determine revolution speed of the spindle, spindle feed speed, number of revolutions following completion of a cut, etc. With such information in memory, the operator needs only to select the appropriate program settings, center the spindle, then allow the system to control itself. For example, the user enters data into the controller 162, including how much metal is to be removed and the type of metal being machined. Using a look-up table externally or stored within memory, the input information is used to determine rate of removal of metal, i.e., feed per revolution. The number of rotations of the cutter after completion of the cut, for the "polishing" step is entered, or may be included within the stored parameters in memory, since, in most cases, the type of metal and amount of cut will determine the number of rotations for this step. The user simply needs to activate the system after the initial input of information for a given cylinder head, recentering on each subsequent valve seat before activation.

Transmission linkage 164 provides means for transferring the force from drive motor 138 to spindle 150 to rotate the spindle. Linkage 164 enters the spherical housing 140 through the side of the housing closest to the drive motor 138, and directly contacts the spindle within the housing 140. This permits the spindle 150 to be as short and lightweight as possible, thus minimizing flexion and eccentricity. Universal or homokinetic joints 166 and 168 absorb any non-linearity in the linkage when the spherical housing 149 is shifted along any axis or at an angle with respect to drive motor 138. The linkage 164 also has telescoping joints to compensate for length changes due to relative movements between the spherical housing 140 and drive motor 138. Cone-shaped pinions drive the spindle rotation in response to rotation of the axis of drive motor 138. (These features are shown and described in more detail in FIG. 3.)

Figure 2:
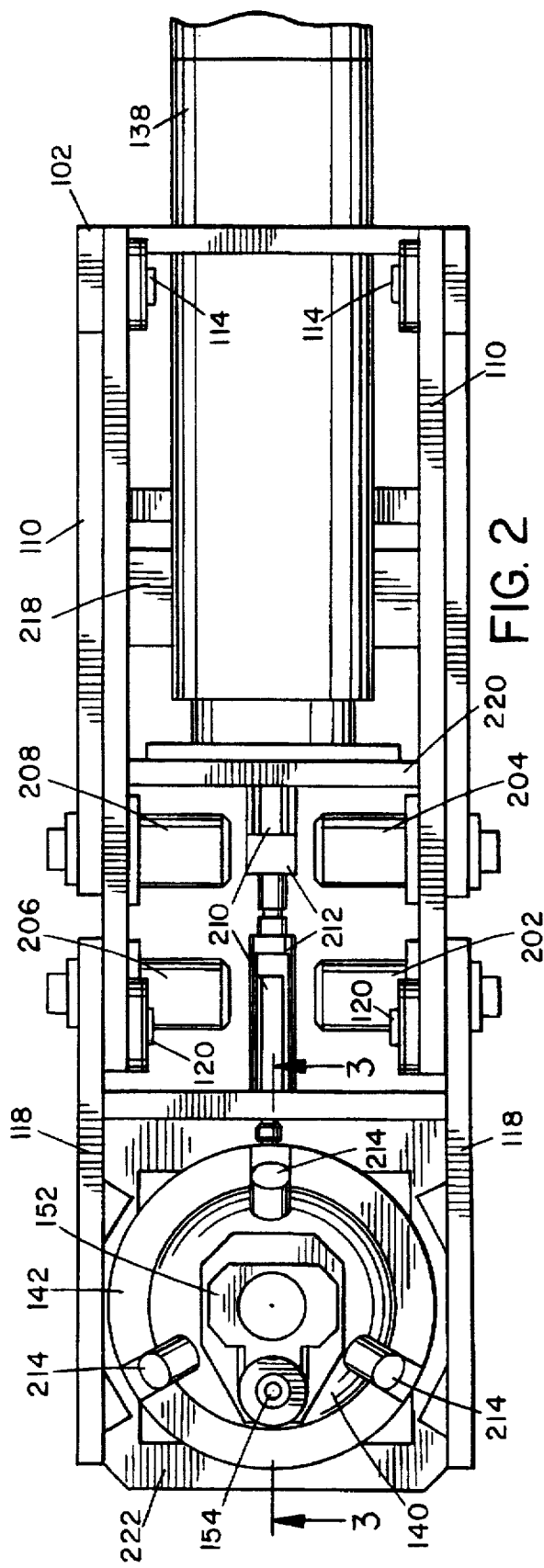
FIG. 2 is an enlarged top plan view of the machine head.

Referring now to FIG. 2, which is a top view of the apparatus, the arms 110 and 112 of the pantograph are disposed symmetrically on both sides of the base support. Arms 110 are joined together at their distal ends by connecting bar 216. Drive motor 138 is mounted between arms 112 on support 218 and by connecting plate 220.

Transmission linkage 164 which is connected to the drive shaft of motor 138 has telescoping joints consisting of shaft 210 and sleeve 212, which have mating cross-section, e.g., hexagonal, which transfer rotational force from one to the other while allowing shaft 210 to slide axially within sleeve 212 to increase or shorten the effective length of the linkage. Universal or homokinetic joints 166 and 168 permit flexing of the linkage to compensate for relative angular motion between the drive motor 138 and the spherical housing 140 while maintaining the drive rotation.

Locking pistons 202, 204, 206, 208 are attached to pantograph arms 112 and are operated pneumatically or by other means as are known in the art (e.g., hydraulically, electromechanically or magnetically). Pistons 204 and 208 provide force against the pantograph arms 112 and the base 102 to prevent movement with respect to each other. Pistons 202 and 206 compress pantograph arms 112 and head portion 118 to hold the two together. Both sets of pistons are activated when the desired coarse z-axis level has been attained by raising or lowering the pantograph to lock the pantograph in the desired position. Once the machining process is completed, the pistons are deactivated to permit the distal end of the pantograph to be shifted downward to lift the head portion 118 and spindle 140.

In order to assure the smoothest travel when moving the pantograph, it is preferred that bearings be provided between the moving surface at pivot points 114, 116 and 120. The bearings may be either ball, sleeve or other bearings as are known in the art, to minimize friction at the pivot points.

The sphere seats 142 and 144 by which spherical housing 140 is supported and stabilized are mounted on a support frame 222 which includes an air cushion to allow fine adjustment along the x and y axes. The range of movement is limited to approximately 1 cm along the x and y axes. Once the pilot has been moved to the general area to be machined using the air cushion 108 for large x,y movement, the fine adjustment is made to center the pilot 158 over the valve guide in the cylinder head. In each case air cushions are turned off after the desired positioning is achieved, with the weight of the base 102 and the weight of the combined spindle assembly and sphere seats 142 and 144 effectively locking the spherical housing on the seats, providing stabilization of the positioning. Additional locking of the sphere seat may be provided by pneumatic pistons which are activated when the air cushion is deactivated to compress the lower sphere seat 144 and the support 222 together to prevent relative movement. Other types of pistons as known in the art, including hydraulic, mechanical or electromechanical, may be used.

Figure 3:
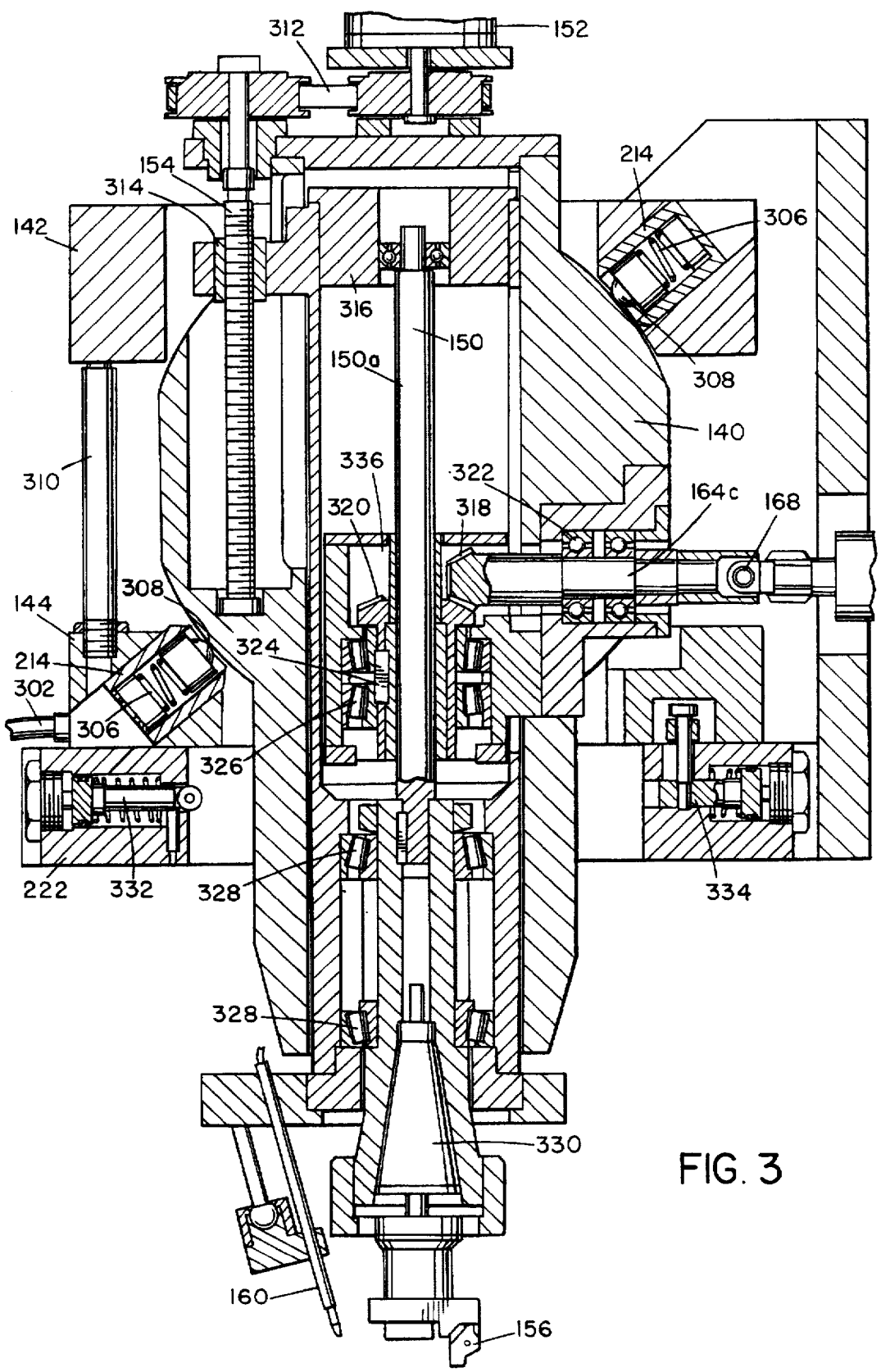
FIG. 3 is an enlarged sectional view taken on line 3—3 of FIG. 2.

Referring now to FIG. 3 which illustrates the details of the spindle head assembly, support frame 222 is fixedly attached to the lower edge of head portion 118. An air cushion (aerostatic bearing) is formed by forcing pressurized air into the spacing between the sphere seat 144 and support frame 222. As illustrated, the air is introduced into sphere seat 144 via air tubing 302 to the left of the sphere seat 144, allowing it to be readily and smoothly shifted within the x, y plane. The range of motion is limited, on the order of 1 cm.

Figure 6:
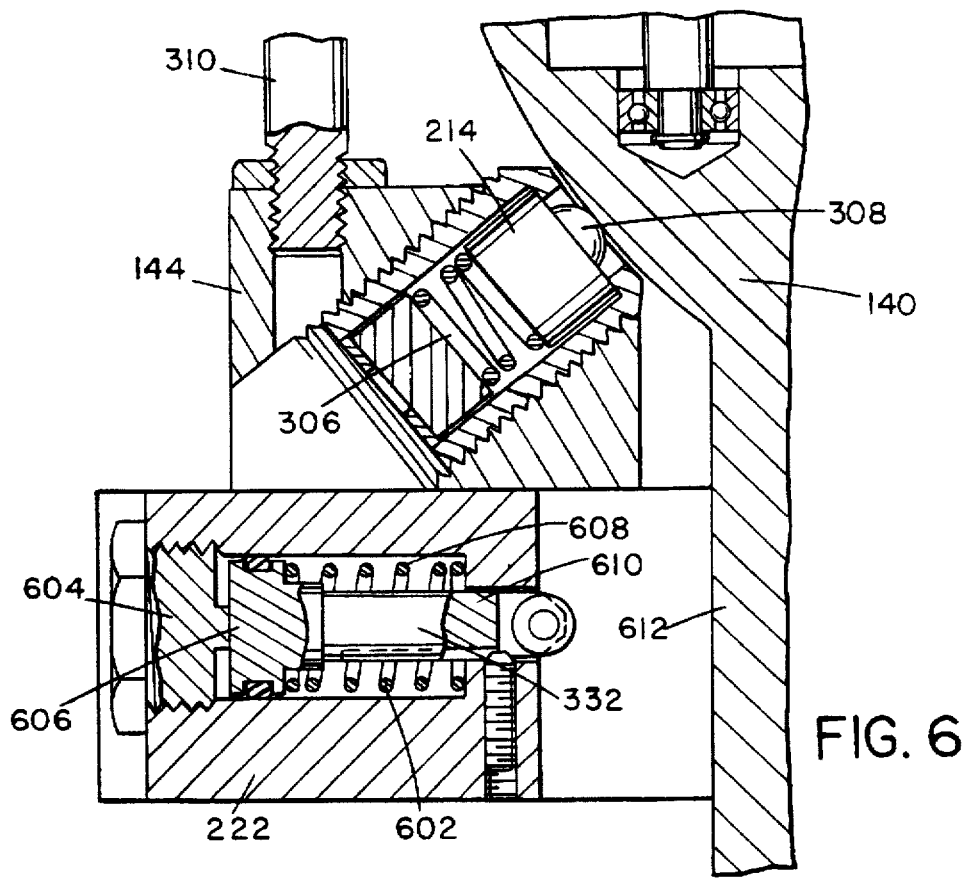
FIG. 6 is an enlarged detail of a portion of FIG. 3.

Coincident with, or separately from the air cushion, sphere seat bearings 214 are activated by applying air pressure via air tubing 302 to compress spring 306 and force the ball bearing 308 outward to contact the outer shell of spherical housing 140. Separate activation of the air bearing between sphere seat 144 and support frame 222 and the sphere seat bearings 214 may be achieved by providing separate air inlets while isolating the bearings from each other. Further details of sphere seat bearings 214 is illustrated in FIG. 6. There are preferably three sphere seat bearings 214 associated with each sphere seat, spaced at uniform spacings around the seats, although more may be used.

Referring still to FIG. 3, spherical housing 140 is pivotable around its center point (centroid) to provide angular manipulation of the spindle. This adjustability provides means for machining valve seats disposed at an angle with respect to the z-axis. After manipulation of the spherical housing 140 to achieve the desired angle, the air pressure to sphere seat bearings 214 is cut off, causing the ball bearing 308 to retract back into its housing with sphere seat 144. While the weight of the spherical housing may be sufficient to retain its position during machining, it would be preferable to provide means for locking the sphere in position. This locking means can include a locking piston which compresses the spherical housing against the sphere seat, or the sphere seat itself can be used by decreasing the space between lower sphere seat 144 and upper sphere seat 142, which may be done, for example, pneumatically, hydraulically or by a screw-type adjustment. For example, connection bolt 310, which joins the upper and lower sphere seats, could be a piston which is compressed pneumatically. Note that while only one connection bolt 310 is visible in the figures, at least two, and preferably three connection bolts 310 are used, placed at equal spacings around the rings which make up sphere sets 142 and 144.

Still referring to FIG. 3, stepper motor 152 is fixedly mounted on top of spherical housing 140 and is connected via drive belt (or chain) 312 to drive screw 154, which is disposed within a slotted cavity in the spherical housing. Carriage 314 runs up and down drive screw 154 as it turns and is connected by linkage 316 to spindle 150.

Stepper motor 152 is controlled by system controller 162, which may be a microprocessor with control software, to provide small range z-axis adjustment to complement the large range z-axis movement provided by the pantograph. Stepper motor 152 also drives the feed of the spindle during machining and retraction after completion. The speed at which the spindle is fed is controlled by system controller 162 which also received input from the tachometer 170 of drive motor 138 so that the correct feed rate is provided based upon the speed of the drive motor. Other control software may be provided to provide further control data, such as the hardness of the material of which the cylinder head is made, allowing adaptation of the machining speeds depending on the material.

Further input to the system controller is provided by linear gauge 160, which is shown in the art, which measures the distance to the surface of the cylinder head to control stepper motor 152 to assure accurate depth machining of the valve seats regardless of the orientation of the cylinder head surface relative to the x, y plane. Since linear gauge 160 moves with the spindle, it will always be appropriately angled for providing the distance measurement.

Rotation of spindle 150 is driven by drive motor 138 and transmission linkage 164. As illustrated, section 164c of the transmission linkage is connected at its distal end to universal joint 168 and at its proximal end to cone-shaped pinion 318. Bearings 322 are fixed within spherical housing 140 and serve to stabilize the linkage section 164c. Pinion 318 cooperates with cone-shaped pinion 320 on a rototranslator arbor 324 to rotate spindle 150. Bearing sets 326 are contained within a housing 336 formed within spherical housing 140 to guide pinion 320 and do not move with the spindle. Pinion 320 is also retained within housing 336. Bearing sets 328 serve to further stabilize the spindle to ensure uniform concentric rotation. The spindle 150 includes arbor 150a at its upper portion. Arbor 150a is driven by pinion 320, and moves up and down with respect to pinion 320.

Fixed at the lower end of spindle 150 is tool holder 330 to which is attached the cutting tip 156. The cutting tip 156 is typically tungsten carbide, ceramic coated carbide or other hard alloys, and selection of an appropriate tip and tool holder 330 is known in the art. The pilot 158 (shown in FIG. 1) is all held by tool holder 330. Selection of an appropriate pilot is within the level of skill in the art.

After completion of the machining of a valve seat and the retraction of the pilot from the valve guide, the spindle is recentered before proceeding to the next machining site. Recentering is achieved by the use of pneumatic jacks/pistons 332 and 334, which are shown in FIG. 3 and illustrated in more detail in FIGS. 6 and 7, respectively.

Referring to FIG. 6, pneumatic jack/piston 332 is retained within cavity 602 of support frame 222. There are preferably more than two pneumatic jacks/pistons 332 provided, distributed at equal spacings around support frame 222. To recenter the spherical housing, pneumatic jack/piston 332 is activated by admitting air pressure into chamber 604 which applies pressure to cylinder 606, depressing spring 608 and forcing piston 610 toward the neck portion 612 of spherical housing 140. If the neck portion 612 is closer than the full travel of the piston 610, it will be pushed back toward center. The length and travel of each of the pneumatic jacks/pistons are selected to center the spindle along the z-axis. At the same time that the angular recentering step is being performed, sphere seat bearings 214 are enabled to facilitate pivoting of the sphere.

Figure 7:
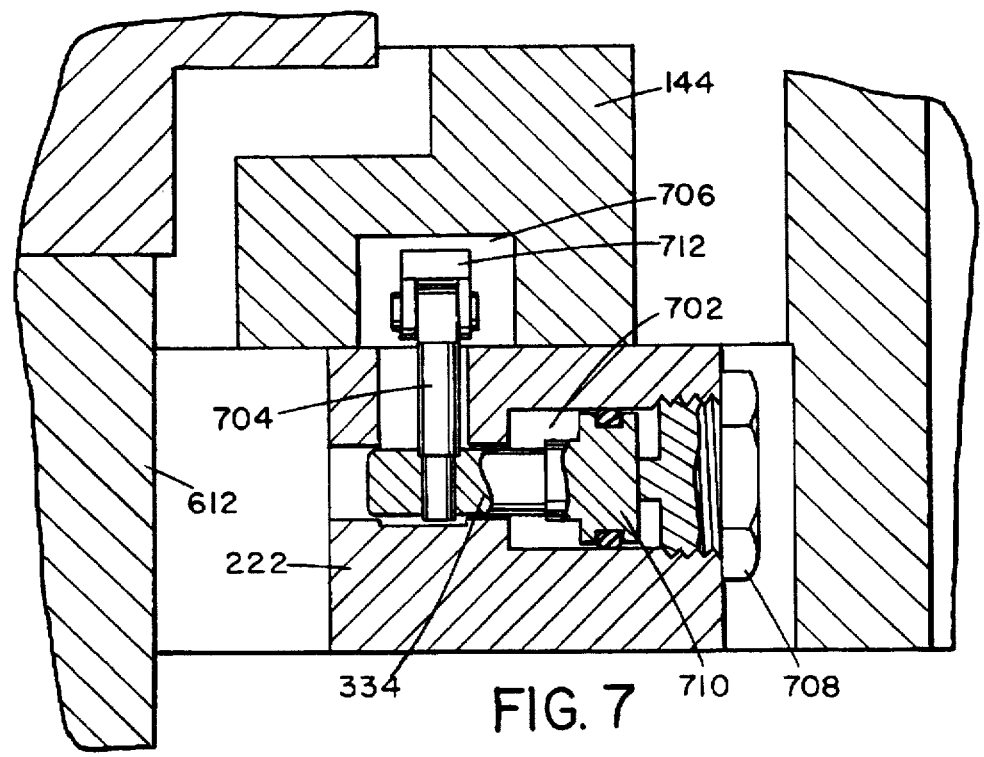
FIG. 7 is an enlarged detail of another portion of FIG. 3.

Now referring to FIG. 7, pneumatic jack/piston 334 is retained within cavity 702 of support frame 222 with extension 704 extending into cavity 706 of sphere seat 144. As previously described, sphere seat 144 is capable of small range x, y transaction with respect to support frame 222, with such motion being facilitated by an air cushion created between the sphere seat 144 and support frame 222. To recenter the spindle at the zero position, i.e., x=0, y=0, air pressure is introduced through plug 708 which forces piston 710 inward. The head portion 712 of extension 704 moves inward to contact the walls of cavity 706, pushing the sphere seat 144 for the full travel of piston 710 and back to the zero position at the same time the piston 334 is activated the air cushion between sphere seat 144 and support frame 222 is activated to move the sphere seat 144. There are preferably four, and a minimum of three, such pneumatic jacks/pistons 334 to provide +x, -y, +y, and -y correction. Alternatively, simultaneously pneumatic jack/piston may have extendible plugs which pop outward in each of the four directions to contact all four walls of the cavity 706. In this case only one, or possibly two, such pistons would be required. Similarly, one or more pairs of pneumatic jacks/pistons could have one piston with pop-out plugs along the x-axis and one with pop-out plugs along the y-axis could be used. Any combination of the described pneumatic jacks/pistons may also be used.

Figure 4:
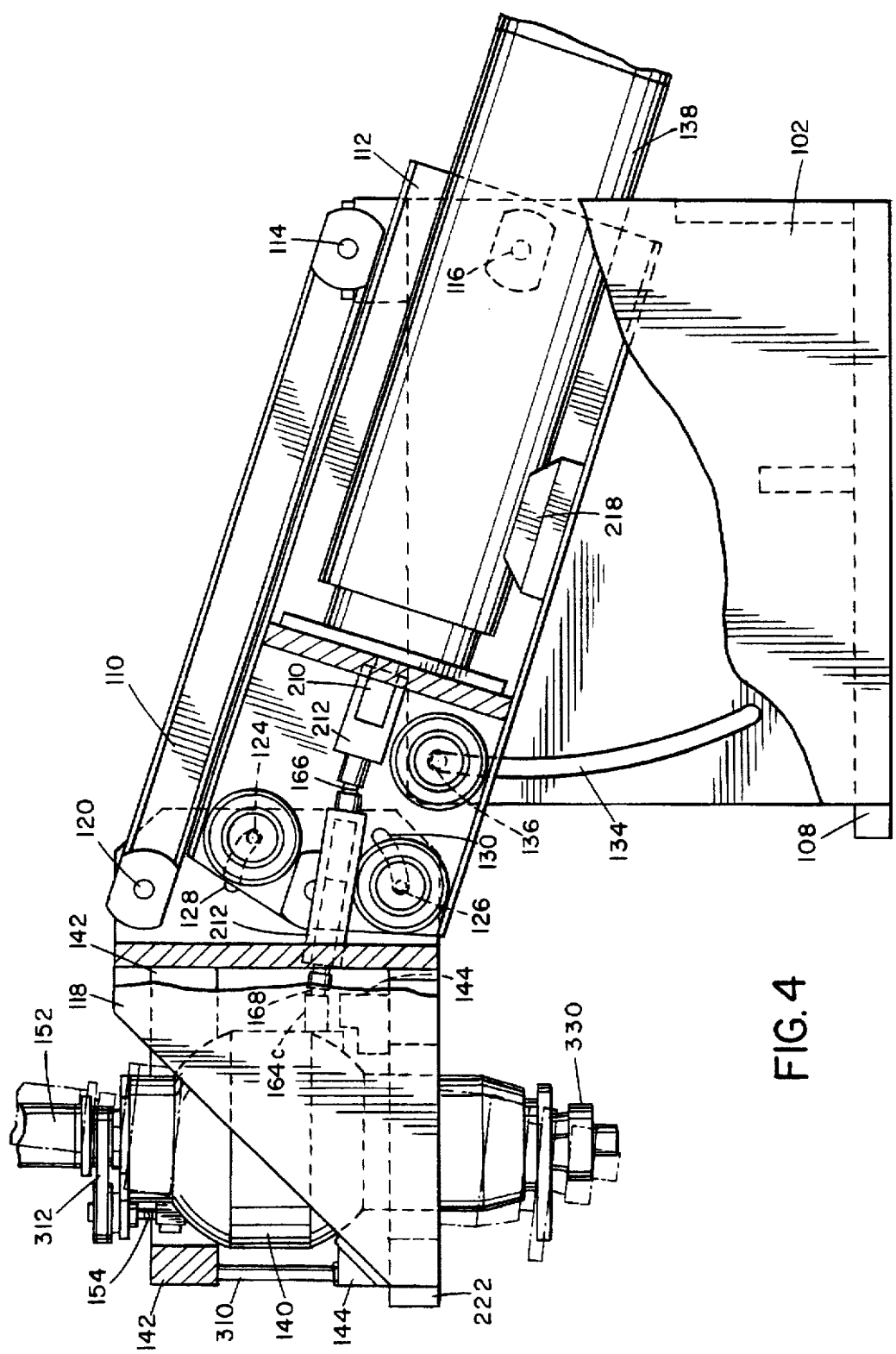
FIG. 4 is a side elevation view, partially cut away, with the drilling head in the uppermost position.
Figure 5:
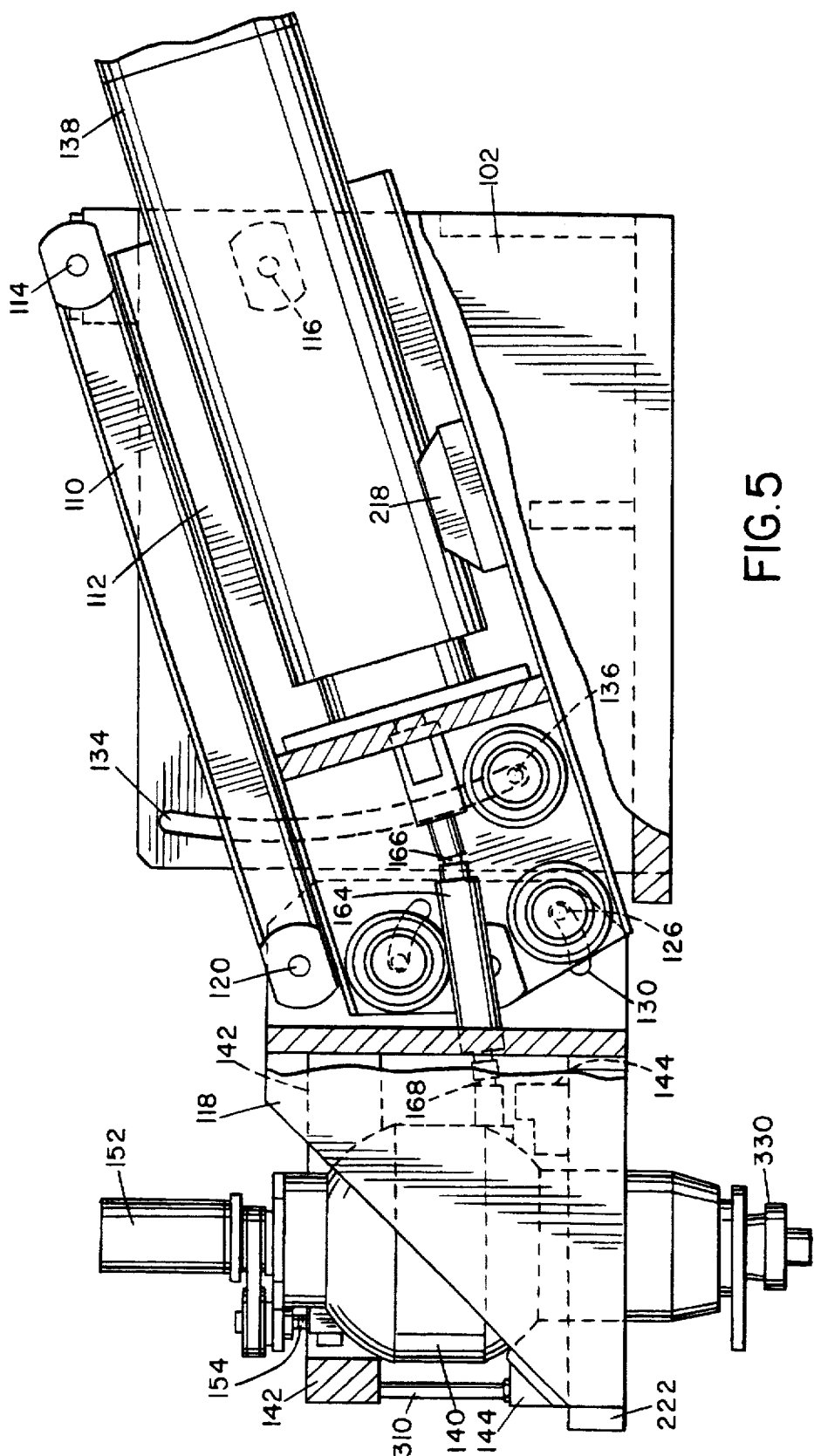
FIG. 5 is a similar side view with the head in a lower position.

The operation of the pantograph and spherical housing will become more apparent by viewing FIGS. 4 and 5.

In FIG. 4, the pantograph is positioned to raise the spindle assembly, for example, when a machining step is finished, the proximal end of pantograph arms 110 and 112 are shifted upward and the distal end is moved downward. As is apparent, arcuate channel 134 guides arm 112 as it pivots about point 116. Due to the relative pivoting between frame 118 and the pantograph arms, the bottom 132 of frame 118 and the pantograph arms, the bottom 132 of frame 118 remains parallel with the x, y plane. To assure retention of linkage between drive motor 138 and the spindle (not shown here), transmission linkage 164 has universal joints 166 and 168 which pivot while still maintaining connection. Further, since the relative angle between the motor and spindle portions of the system changes the length requirements of the linkage, telescoping connectors consisting of sleeve 212 and shaft 210 are provided to provide for lengthening or shortening of the linkage 164 as needed to maintain connection.

Also provided in FIG. 4 is an illustration of the spherical housing 140 in the zero position (solid lines) and with an angular shift (slashed lines) to permit machining of valve seats positions at an angle relative to the x, y-plane.

FIG. 5 illustrates the inventive system with the pantograph moved to the low position to facilitate machining of lower profile cylinder heads. Again, the pantograph mechanism permits frame 118 to remain aligned horizontally, parallel to the x, y-plane.

The use of the pantograph permits essentially effortless adjustments for large changes in height relative to the base of the system. Fine adjustment of the machining height and depth is provided by stepper motor 152. Similarly, the air cushion platform 108 (shown in FIG. 1), when activated, permits large changes in the horizontal plane while fine x, y adjustment is provided between frame 118 and sphere seat 144. The division of displacements into the separate procedures provides a significant reduction in the mobile masses during centering operations. The large x, y displacement provides adjustment from one valve seat to another while the small x, y displacement provides adjustment from one valve seat to another while the small x, y displacement allows centering of the pilot within the valve guide without flexion of the pilot as occurs in prior art systems.

The large z-axis displacement permits pilot penetration within valve guides and compensates for height differences between cylinder heads. It also eliminates clearance problems encountered in prior art systems, which rely exclusively on slides. Further, the pantograph can be manipulated manually, while prior art slide-based systems require motors or heavyweight manual screw drivers to raise and lower the machine head.

The reduction in mobile mass is further enhanced by the transmission linkage and pinions which permits relative isolation of the spindle drive motor from the spindle. Further, the contacting and driving of the spindle within the spherical housing allows a short, rigid and light spindle while retaining the torque of a powerful drive motor.

In the present invention, the size and mass of the machine head is minimized while retaining the capacity of prior art systems. This is significant since modern engines have smaller valve guides than those of older engines. The prior art systems with their massive machine heads were originally designed for older engines which used pilots on the order of 8 mm in diameter. While these thicker pilots may have tolerated the flexion induced by the centering process, the ringing and flexion is more of a problem with the smaller pilots used in modern engines. To illustrate, the circumference, i.e. the contact surface, of an 8 mm pilot is four times that of a 4 mm pilot. Comparing the masses of the machine heads, the prior art head of 200 kg generates much greater kinetic energy than the 20 kg head of the present invention. Combining this with the decreased diameter and surface of the pilot's required for newer engines, the centering of a prior art machine becomes much more problematic as compared to the present invention.

The system of the present invention further provides a level of control to permit precise machining of the valve seats to the same depth to ensure a balanced compression ratio between the engine cylinders. The control is achieved without manual intervention and is made possible by the use of the linear probe, or other distance measurement means, which controls the descent of the spindle without regard to the angle at which the machining is being done. The probe provides feedback to the system controller, which, in combination with a precision screw driver attached to the stepper motor, can be used for continuous monitoring of the cutting process to assure identical valve seat depth at each location on the cylinder head. Thus, the inventive system provides means for optimizing engine output and performance.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. An assembly for machining an engine cylinder head having a plurality of valve seats, the assembly comprising:
   a retention means for retaining the engine cylinder head in a fixed position on a work surface;
   a base disposed adjacent the work surface and having a first means for movement in a first x-y plane with respect to the work surface, the first means for movement having a first limited range of movement within the first x-y plane;
   a support frame attached to the base so that the support frame overhangs the engine cylinder head retained by the retention means, the support frame having a bottom edge, wherein the bottom edge remains parallel to the first x-y plane;
   a spherical support assembly slidably disposed on the support frame, the spherical support assembly having a second means for movement in a second x-y plane and having a second limited range of movement much smaller than the first limited range of movement;
   a spherical housing supported within the spherical support assembly so that the spherical housing can be pivoted around a centroid of the spherical housing;
   a spindle at least partially retained within the spherical housing and having a lower portion extending below the support frame, the spindle being rotatable within the spherical housing and axially translatable along a substantially vertical line running through the centroid of the spherical housing;
   a cutting tool attached to and extending from the lower portion of the spindle so that the cutting tool is concentrically rotatable with the spindle;
   spindle height adjustment means mounted within the support frame for controlling the height of the cutting tool relative to the engine cylinder head;
   a drive motor mounted on the base, the drive motor providing a rotational driving force; and
   a transmission linkage for linking the drive motor to the spindle for providing the rotational driving force for rotating the spindle.

2. An assembly for machining an engine cylinder head as in claim 1 wherein the first means for movement is a first air bearing.

3. An assembly for machining an engine cylinder head as in claim 1 wherein the second means for movement is a second air bearing.

4. An assembly for machining an engine cylinder head as in claim 1 wherein the second limited range of movement is on the order of 1 cm.

5. An assembly for machining an engine cylinder head as in claim 1 wherein the spherical support assembly includes a plurality of bearing surfaces for providing contact between the spherical support assembly and the spherical housing.

6. An assembly for machining an engine cylinder head as in claim 1 wherein the retention means includes means for varying an angle at which the engine cylinder head is retained.

7. An assembly for machining an engine cylinder head as in claim 1 wherein the spindle height adjustment means comprises a spindle motor mounted on the spherical housing and linked to the spindle for raising and lowering the spindle with respect to the spherical housing.

8. An assembly for machining an engine cylinder head as in claim 7 further comprising a control means for generating a signal for controlling the spindle motor so that the spindle motor can raise and lower the spindle while the spindle is rotating.

9. An assembly for machining an engine cylinder head as in claim 1 wherein in the spindle height adjustment means includes a first height adjustment means for varying a first relative height of the support frame relative to the base and a second height adjustment means for varying a second relative height of the cutting tool with respect to the support frame.

10. An assembly for machining an engine cylinder head as in claim 9 wherein the first height adjustment means is a pantograph disposed on the base and attached to the support frame.

11. An assembly for machining an engine cylinder head as in claim 9 wherein the second height adjustment means is a spindle motor mounted on the spherical housing and linked to the spindle for raising and lowering the spindle with respect to the spherical housing.

12. An assembly for machining an engine cylinder head as in claim 1 further comprising a control means for generating a signal for controlling the spindle motor so that the spindle motor can raise and lower the spindle while the spindle is rotating.

13. An assembly for machining an engine cylinder head as in claim 1 wherein the drive motor has a variable speed, and further comprising a control means for generating a signal for controlling a rotational speed of the spindle.

14. An assembly for machining an engine cylinder head as in claim 1 wherein the transmission linkage is a homokinetic joint.

15. In a system for machining an engine cylinder head having a plurality of valve seats and valve guides, the system being positioned upon a work surface generally in a horizontal plane, and comprising a retention means for retaining the workpiece in a fixed relationship with respect to the work surface; a base disposed adjacent to the work surface, the base being movable in a first x-y plane within a first limited range of movement with respect to the retention means; a support frame attached to the base so that the support frame overhangs the work surface, the support frame having a bottom edge, wherein the bottom edge remains generally parallel to the work surface; a spherical support having a plurality of retractable bearing surfaces supported on the support frame; a spherical housing supported on the plurality of retractable bearing surfaces so that the spherical housing can be pivoted around a centroid of the spherical housing; a spindle rotatably retained within the spherical housing; a translational means attached to the spindle for translating said spindle within the spherical housing along a substantially vertical line; a cutting tool extending from the spindle below the support frame; and a drive motor disposed within the base and linked to the spindle for providing rotational force to the spindle; the improvement comprising:

a flotation surface disposed between the support frame and the spherical support, the flotation surface providing movement of the spherical support, the plurality of retractable bearing surfaces and the support frame in a second x-y plane within a second limited range of movement, the second limited range of movement being much smaller than the first limited range of movement.

16. The system of claim 15 wherein the flotation surface is an air bearing.

17. The system of claim 15 wherein the second limited range of movement is on the order of 1 cm.

18. The system of claim 15 wherein the translational means comprises a spindle motor mounted on the spherical housing and linked to the spindle for raising and lowering the spindle with respect to the spherical housing.

19. The system of claim 15 further comprising a coarse height adjustment means for providing vertical movement of the support frame with respect to the base.

20. A machine tool for machining an engine cylinder head having a plurality of valve seats and corresponding valve guide, the machine tool comprising:

a work surface;

a retention means disposed on the work surface for retaining the engine cylinder head in a fixed relationship with the work surface;

a base disposed adjacent the work surface;

a first horizontal movement means for moving the base within a first horizontal plane relative to the work surface, the first horizontal movement means having a first range of movement;

a support frame attached to the base so that the support frame overhangs the work surface, the support frame having a lower planar portion which remains substantially parallel to the work surface;

a spherical support assembly supported on the support frame, the spherical support assembly having a plurality of bearing surfaces;

a second horizontal movement means for moving the spherical support assembly within a second horizontal plane relative to the work surface, the second horizontal movement means having a second range of movement much smaller than the first range of movement;

a spherical housing supported on the plurality of bearing surfaces within the spherical support assembly so that the spherical housing can be pivoted around a centroid of the spherical housing;

a spindle at least partially retained within the spherical housing and having a lower portion extending below the support frame, the spindle being rotatable within the spherical housing and axially translatable along a substantially vertical line running through the centroid of the spherical housing;

a cutting tool attached to and extending from the lower portion of the spindle so that the cutting tool is concentrically rotatable with the spindle;

spindle height adjustment means mounted within the support frame for controlling the height of the cutting tool relative to the engine cylinder head;

a drive motor mounted within the base, the drive motor providing a rotational driving force; and a transmission linkage disposed between the drive motor and the spindle for linking the drive motor to the spindle for providing the rotational driving force to the spindle.

* * * * *